(12) United States Patent
Nakashima

(10) Patent No.: US 6,530,861 B1
(45) Date of Patent: Mar. 11, 2003

(54) DEVICE FOR CONTROLLING AN ENGINE EQUIPPED WITH A SYNCHRONOUS MESH-TYPE AUTOMATIC TRANSMISSION

(75) Inventor: Masami Nakashima, Hyogo-ken (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/714,520

(22) Filed: Nov. 17, 2000

(30) Foreign Application Priority Data

May 19, 2000 (JP) ........................................ 2000-148851

(51) Int. Cl.$^7$ ............................................... B60K 41/28
(52) U.S. Cl. ............................ 477/85; 477/83; 477/105
(58) Field of Search ............................. 477/83, 84, 87, 477/90, 91, 109, 112, 113

(56) References Cited

U.S. PATENT DOCUMENTS

| | | | |
|---|---|---|---|
| 4,493,228 A | * | 1/1985 | Vukovich et al. ............ 477/109 |
| 4,785,917 A | * | 11/1988 | Tateno et al. ................ 192/3.58 |
| 5,072,815 A | * | 12/1991 | Jarvis .......................... 477/83 |
| 5,533,946 A | * | 7/1996 | Markyvech .................. 477/124 |
| 6,258,009 B1 | * | 7/2001 | Thomas et al. .............. 477/109 |

FOREIGN PATENT DOCUMENTS

JP 2-9921 1/1990

* cited by examiner

*Primary Examiner*—Ankur Parekh
(74) *Attorney, Agent, or Firm*—Sughrue Mion, PLLC

(57) ABSTRACT

A device for controlling an engine equipped with a synchronous mesh-type automatic transmission which decreases shock at the time of changing the speed, and improves the response and drive feeling at the time of changing the speed, including a controller that controls a throttle actuator and the automatic transmission, sets a synchronizing rotational speed of the engine rotational speed relative to the clutch when the clutch is disconnected at the time of changing the speed, fixes the throttle opening degree so that the engine rotational speed converges to the synchronizing rotational speed, gradually returns the throttle opening degree to an opening degree that corresponds to the synchronizing rotational speed when a difference between the engine rotational speed and the synchronizing rotational speed has converged to lie within a first predetermined range, and connects the clutch again when the direction of change of the engine rotational speed is inverted.

7 Claims, 7 Drawing Sheets

DEVICE FOR CONTROLLING AN ENGINE EQUIPPED WITH A SYNCHRONOUS MESH-TYPE AUTOMATIC TRANSMISSION

BACKGROUND OF THE INVENTION

1. Field of the Invention

The present invention relates to a device for controlling an engine equipped with a synchronous mesh-type automatic transmission mounted on an automobile. More particularly, the invention relates to a device for controlling an engine equipped with a synchronous mesh-type automatic transmission which decreases shock at the time of changing the speed, and improves the response and drive feeling at the time of changing the speed.

2. Prior Art

FIG. 5 is a diagram schematically illustrating the constitution of a general device for controlling an engine equipped with a synchronous mesh-type automatic transmission.

In FIG. 5, an engine 1 is equipped with an intake pipe 1a and an exhaust pipe 1b, and each cylinder in the engine 1 is provided with a fuel injection valve and an ignition means (not shown).

As is well known, further, the engine 1 is provided with a temperature sensor (not shown) for detecting the temperature of the cooling water, and a crank shaft of the engine is provided with a reference position sensor and a crank angle sensor (not shown) that works as a rotation sensor.

A throttle valve 2 is provided in the intake pipe 1a to set the amount of the air taken in by the engine 1, the throttle valve 2 being driven by a throttle actuator 3 having a motor.

The throttle valve 2 is further provided with a throttle opening sensor 4 for detecting the throttle opening degree $\theta$.

An automatic transmission 5 having a clutch 5a and a transmission 5b is connected to the output side of the engine 1. Wheels (not shown) of the automobile are coupled to the engine 1 through the automatic transmission 5.

Shafts of the automatic transmission 5 are provided with an engine rotation sensor 6 that detects the input rotational speed as the engine rotational speed Ne and with a vehicle speed sensor 7 that detects the output rotational speed of the automatic transmission 5 as the output rotational speed.

An accelerator pedal and a gear shift lever operated by a driver are provided with an accelerator opening sensor 8 for detecting the accelerator opening degree $\alpha$ and with a shift position sensor 9 for detecting the shift position GS, respectively.

Detection signals (engine rotational speed Ne, throttle opening degree $\theta$, etc.) of the sensors representing the operation conditions of the engine are input to a controller 10 constituted by an ECU (electronic control unit).

Based upon the input data representing the operation conditions, the controller 10 controls the fuel injection valve and ignition means in the engine 1, controls the throttle actuator 3, and controls the clutch 5a and transmission 5b in the automatic transmission 5.

The controller 10 includes an MPU 11 that constitutes a main body of the controller 10, a memory 12 that operates together with the MPU 11, an input port 13 for receiving data detected by various sensors, and an output port 14 for producing control signals.

The controller 10 controls the actuator that is related to the engine 1 based upon data representing the operation conditions and detected by the sensors.

That is, the controller 10 controls the fuel injection valve and ignition means in the engine 1 as well as the throttle actuator 3 that drives the throttle valve 2, and further controls the clutch 5a and the transmission 5b in the automatic transmission 5, so that the output torque of the engine 1 is transmitted to the wheels.

Further, in the device for controlling the engine equipped with a synchronous mesh-type automatic transmission as shown in FIG. 5, in general, the clutch 5a is disconnected at the time of changing the speed, and the clutch 5a is connected again after the rotational speed Ne of the engine is brought into agreement with the synchronizing rotational speed Ns relative to the clutch 5a.

That is, the controller 10 includes clutch disconnection means for disconnecting the clutch 5a at the time of changing the speed of the engine 1, synchronizing rotational speed-operating means for operating a synchronizing rotational speed Ns of the engine rotational speed Ne that comes into agreement with the output rotational speed of the clutch 5a (input rotational speed of the transmission 5b), and clutch re-connection means for connecting the clutch 5a again at a moment when the engine rotational speed Ne comes into agreement with the synchronizing rotational speed Ns.

In a conventional device for controlling the engine equipped with the synchronous mesh-type automatic transmission disclosed in Japanese Unexamined Patent Publication (Kokai) No. 9921/1990, for example, the throttle opening degree $\theta$ is so controlled that the engine rotational speed Ne maintains a synchronizing rotational speed Ns relative to the clutch 5a during the period from when the clutch is disconnected for changing the speed until when the clutch is connected again.

FIGS. 6 and 7 are timing charts illustrating the operation for changing the speed using the conventional device disclosed in the above publication, wherein FIG. 6 illustrates the operation during the acceleration (while being shifted up) and FIG. 7 illustrates the operation during the deceleration (while being shifted down).

Referring to FIG. 6, when the driver operates a gear shift lever, the controller 10 detects the up-shifting state during the acceleration based upon the engine rotational speed Ne and the shift position GS, and disconnects the clutch 5a.

In order to bring the engine rotational speed Ne into agreement with the synchronizing rotational speed Ns (see a dotted line in FIG. 6) relative to the clutch 5a, the controller 10 so actuates the throttle actuator 3 that the throttle opening degree $\theta$ is brought to the fully closed side thereby to lower the engine rotational speed Ne.

The synchronizing rotational speed Ns can be inversely operated by the synchronizing rotational speed operating means in the controller 10 by being replaced by the engine rotational speed Ne based on, for example, the vehicle speed Vr and the shift position GS.

The throttle opening degree $\theta$ while the clutch 5a is being disconnected is set to a target opening degree for equalizing the engine rotational speed Ne to the synchronizing rotational speed Ns.

As shown in FIG. 6, therefore, the engine rotational speed Ne converges to the synchronizing rotational speed Ns with the lapse of time.

Thereafter, at a moment when it is detected that the engine rotational speed Ne is brought into agreement with the synchronizing rotational speed Ns, the controller 10 connects the clutch 5a again and gradually increases the throttle opening degree $\theta$.

This executes the acceleration control operation depending upon the accelerator opening degree α requested by the driver, reduces the shock of connection of the clutch at the time of changing the speed, and prevents deterioration in the drive feeling.

Referring to FIG. 7, when a down-shifting state is detected during the deceleration, the controller 10 disconnects the clutch 5a, so actuates the throttle actuator 3 that the throttle opening degree θ is brought to the fully opened side to increase the engine rotational speed Ne, so that the engine rotational speed Ne is brought into agreement with the synchronizing rotational speed Ns (see a dotted line in FIG. 7).

Thereafter, at a moment when it is detected that the engine rotational speed Ne is brought into agreement with the synchronizing rotational speed Ns, the controller 10 connects the clutch 5a again and gradually decreases the throttle opening degree θ.

This executes the deceleration control operation depending upon the accelerator opening degree α requested by the driver, reduces the shock of connection of the clutch at the time of changing the speed, and prevents deterioration in the drive feeling.

In the device for controlling the engine equipped with the synchronous mesh-type automatic transmission as described above, the throttle opening degree θ is controlled and the engine rotational speed Ne is brought into synchronism with the input rotational speed (synchronizing rotational speed Ns) of the transmission 5b in order to reduce the shock at the time of changing the speed.

However, it has been known that a relation between the throttle opening degree θ and the synchronizing rotational speed Ns varies depending upon the individual engines 1 and the warmed-up state, and it is very difficult to correctly set a target value of the throttle opening degree θ when the clutch 5a is being disconnected.

Further, when the throttle opening degree θ, while the clutch 5a is being disconnected, is maintained at a target opening degree corresponding to a target engine rotational speed Ne (=Ns) as shown in FIGS. 6 and 7, the follow-up performance of the engine rotational speed Ne becomes dull, and an extended period of time is required before the engine rotational speed Ne is brought into agreement with the synchronizing rotational speed Ns.

As shown in FIGS. 6 and 7, further, when the clutch 5a is connected in a stable state where the engine rotational speed Ne is in perfect agreement with the synchronizing rotational speed Ns, the feeling for changing the speed is suppressed, too; i.e., the feeling for the driver who requests acceleration or deceleration is rather impaired.

In the conventional device for controlling the engine equipped with the synchronous mesh-type automatic transmission as described above, the relationship between the throttle opening degree θ and the synchronizing rotational speed Ns varies depending upon the operation conditions. Therefore, it is difficult to correctly set the throttle opening degree θ at the time of changing the speed to a target opening degree corresponding to the synchronizing rotational speed Ns, and the engine rotational speed Ne cannot be brought into correct agreement with the synchronizing rotational speed Ns.

Further, since the throttle opening degree θ during the change of the speed (while the clutch 5a is disconnected) is maintained at a target opening degree corresponding to a target value (=Ns) of the engine rotational speed Ne, an extended period of time is required before the engine rotational speed Ne is brought into agreement with the synchronizing rotational speed Ns.

Besides, since the clutch 5a is connected again in a stable state in which the engine rotational speed Ne is in perfect agreement with the synchronizing rotational speed Ns, the feeling for the driver who requests acceleration or deceleration is impaired.

SUMMARY OF THE INVENTION

The present invention was accomplished in order to solve the above-mentioned problem, and its object is to provide a device for controlling the engine equipped with a synchronous mesh-type automatic transmission which features improved response at the time of changing the speed and improved drive feeling.

A device for controlling an engine equipped with a synchronous mesh-type automatic transmission of the present invention comprises:

various sensors for detecting the operation conditions of an engine inclusive of an engine rotational speed;

a throttle actuator for adjusting the throttle opening degree for setting the amount of the air taken in by the engine;

an automatic transmission including a synchronous mesh-type clutch and a transmission, connected to the output side of the engine; and a controller for controlling the throttle actuator and the automatic transmission based upon the operation conditions;

wherein the controller includes:

clutch disconnection means for disconnecting the clutch at the time of changing the speed of the engine;

synchronizing rotational speed-operating means for operating the synchronizing rotational speed of the engine rotational speed so as to be brought into synchronism with the output rotational speed of the clutch while the clutch is being disconnected;

throttle opening degree-fixing means for fixing the throttle opening degree to a first predetermined opening degree, so that the engine rotational speed quickly converges to the synchronizing rotational speed while the clutch is being disconnected;

throttle opening degree-returning means for gradually returning the throttle opening degree from said first predetermined opening degree toward an opening degree corresponding to said synchronizing rotational speed at a moment when a difference in the rotational speed between the engine rotational speed and the synchronizing rotational speed has converged to lie within a first predetermined range; and clutch re-connection means for connecting the clutch again at a moment when the direction of change in the engine rotational speed is inverted.

In the device for controlling the engine equipped with the synchronous mesh-type automatic transmission of the present invention, the clutch re-connection means connects the clutch again at a moment when the difference in the rotational speed has converged to lie within a second predetermined range after the direction of change in the engine rotational speed is inverted.

In the device for controlling the engine equipped with the synchronous mesh-type automatic transmission of the present invention, the throttle opening degree-returning means sets the throttle opening degree to the second predetermined opening degree between a first predetermined opening degree and an opening degree corresponding to the synchronizing rotational speed at a moment when the difference in the rotational speed has converged to lie within the first predetermined range, and gradually returns the throttle opening degree from the second predetermined opening degree toward the opening degree corresponding to the synchronizing rotational speed.

In the device for controlling the engine equipped with the synchronous mesh-type automatic transmission of the present invention, when the engine is under an accelerating condition and the automatic transmission is in an up-shifting state, the throttle opening degree-fixing means sets the first predetermined opening degree to be smaller than the throttle opening degree that maintains the synchronizing rotational speed, and the throttle opening degree-returning means gradually increases the throttle opening degree from a moment when the difference in the rotational speed has converged to lie within the first predetermined range.

In the device for controlling the engine equipped with the synchronous mesh-type automatic transmission of the present invention, the throttle opening degree-fixing means sets the first predetermined opening degree to the fully closed position.

In the device for controlling the engine equipped with the synchronous mesh-type automatic transmission of the present invention, when the engine is under a decelerating condition and the automatic transmission is in a down-shifting state, the throttle opening degree-fixing means sets the first predetermined opening degree to be larger than the throttle opening degree that maintains the synchronizing rotational speed, and the throttle opening degree-returning means gradually decreases the throttle opening degree from a moment when the difference in the rotational speed has converged to lie within the first predetermined range.

In the device for controlling the engine equipped with the synchronous mesh-type automatic transmission of the present invention, the throttle opening degree-fixing means sets the first predetermined opening degree to the fully opened position.

DESCRIPTION OF THE PREFERRED EMBODIMENTS

Embodiment 1.

An embodiment 1 of the present invention will now be described in detail with reference to the drawings.

Figure 1:
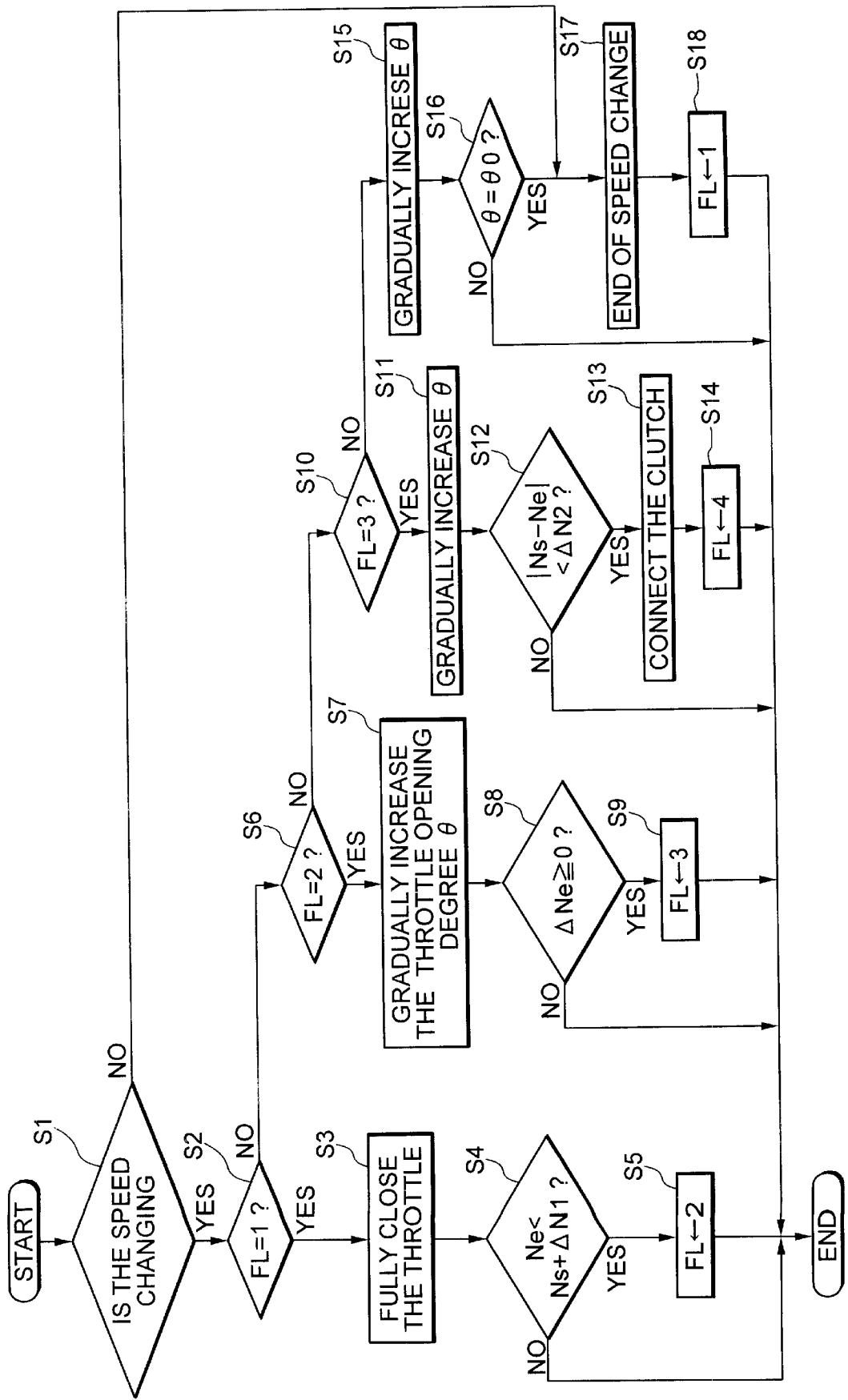
FIG. 1 is a flow chart illustrating the control operation according to an embodiment of the present invention.
Figure 2:
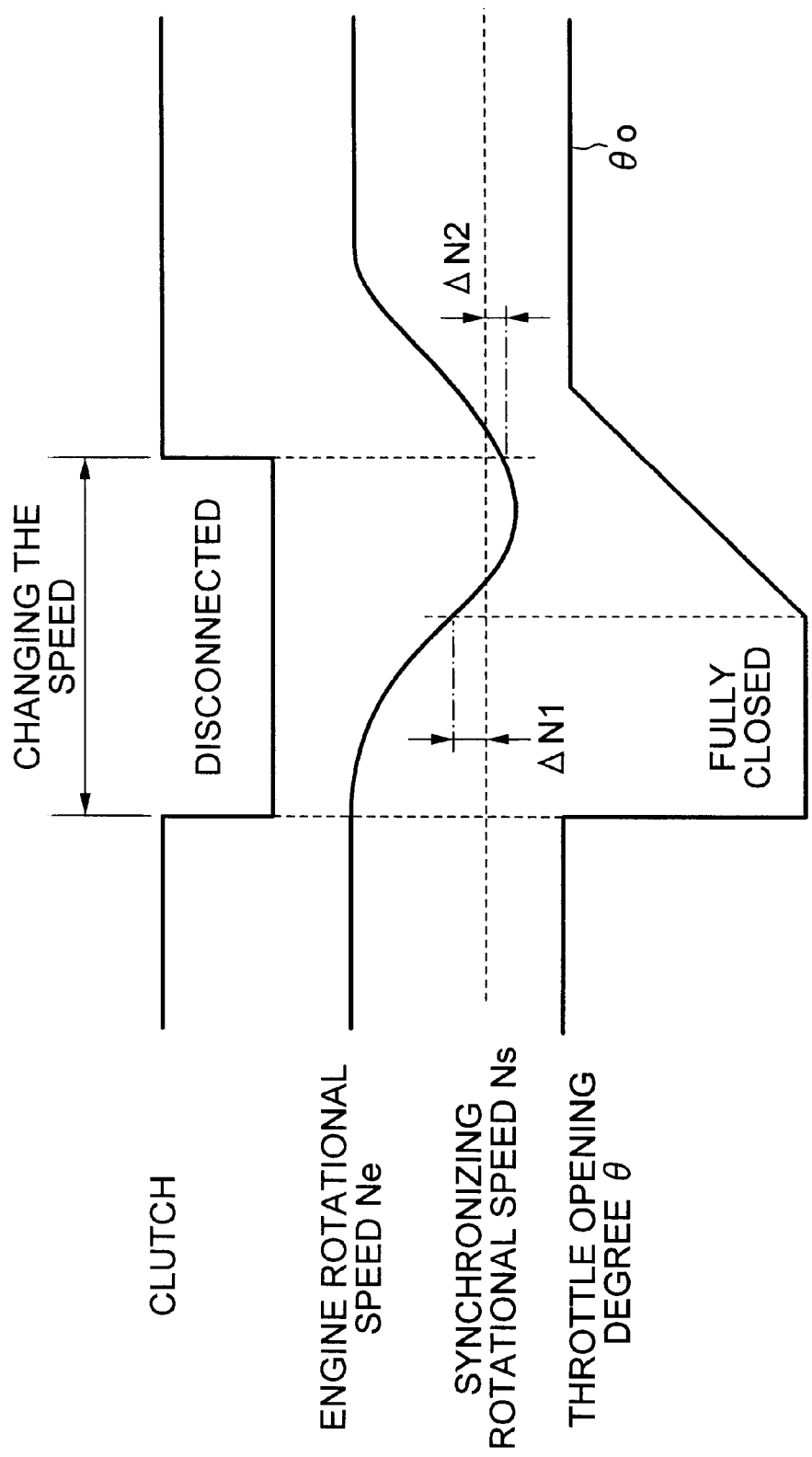
FIG. 2 is a timing chart illustrating the control operation according to the embodiment 1 of the present invention.

FIGS. 1 and 2 are a flow chart and a timing chart illustrating the control operation according to an embodiment 1 of the present invention, i.e., illustrating the control operation at the time of acceleration (up-shifting the speed).

Figure 3:
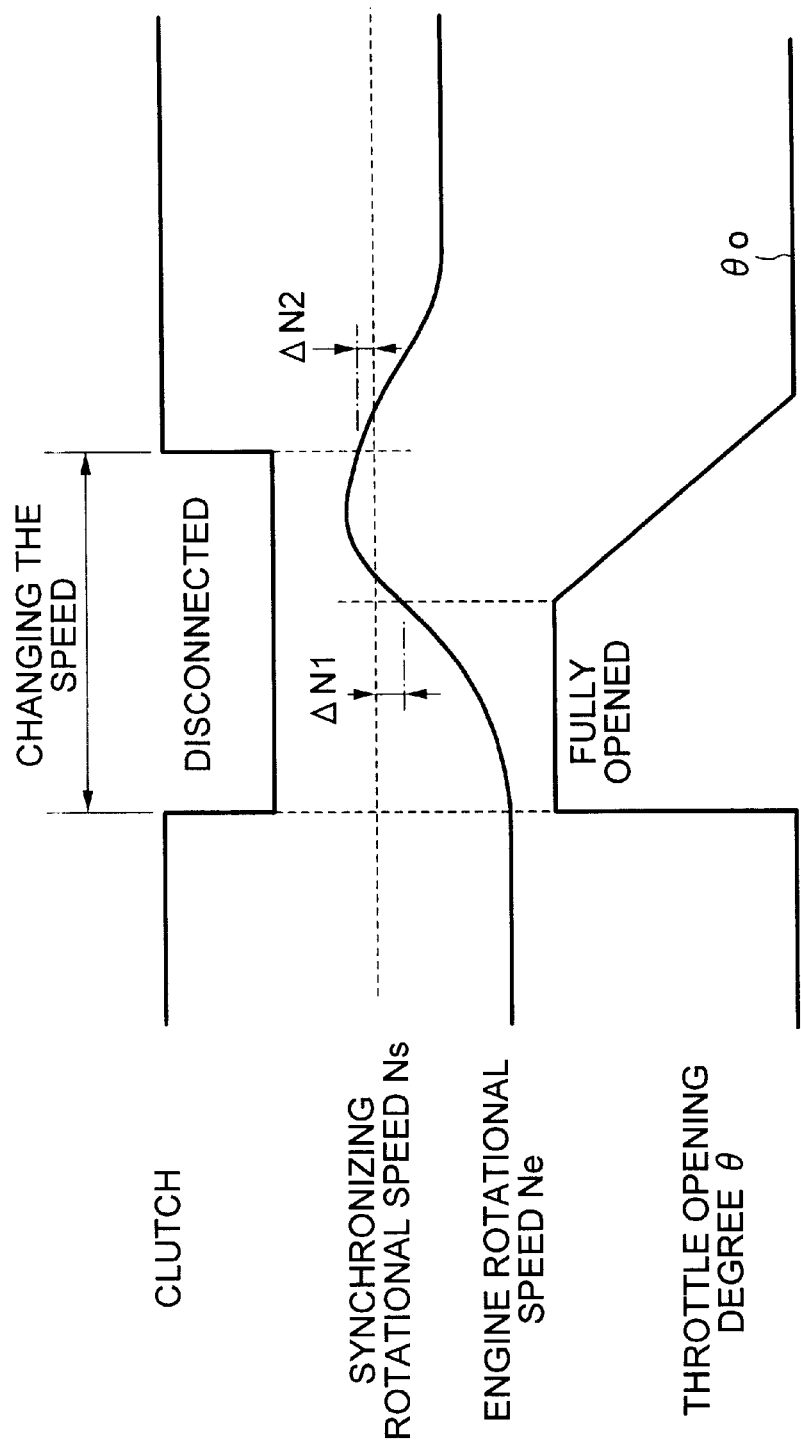
FIG. 3 is a timing chart illustrating the control operation according to the embodiment 1 of the present invention.

FIG. 3 is a timing chart illustrating the control operation of the throttle and clutch during the deceleration (down-shifting the speed) according to the embodiment 1 of the present invention.

The controller 10, in this case, includes throttle opening degree-fixing means and throttle opening degree-returning means, in addition to the clutch disconnection means, synchronizing rotational speed-operating means and clutch re-connection means.

The throttle opening degree-fixing means in the controller 10 sets the throttle opening degree θ to a first predetermined opening degree, so that the engine rotational speed Ne quickly converges to a synchronizing rotational speed Ns while the clutch 5a is being disconnected.

At a moment when the difference in the rotational speed between the engine rotational speed Ne and the synchronizing rotational speed Ns (=|NS−Ne|) has converged to lie within a first predetermined range ΔN1, the throttle opening degree-returning means in the controller 10 gradually returns the throttle opening degree θ back to the opening degree corresponding to the synchronizing rotational speed NS from the first predetermined opening degree.

In this case, the clutch re-connection means in the controller 10 connects the clutch 5a again at a moment when the direction of change in the engine rotational speed Ne is inverted unlike the above-mentioned case.

Concretely, the clutch re-connection means connects the clutch again at a moment when the difference in the rotational speed |Ns−Ne| has converged to lie within a second predetermined range ΔN2 after the direction of change in the engine rotational speed Ne is inverted.

Figure 5:
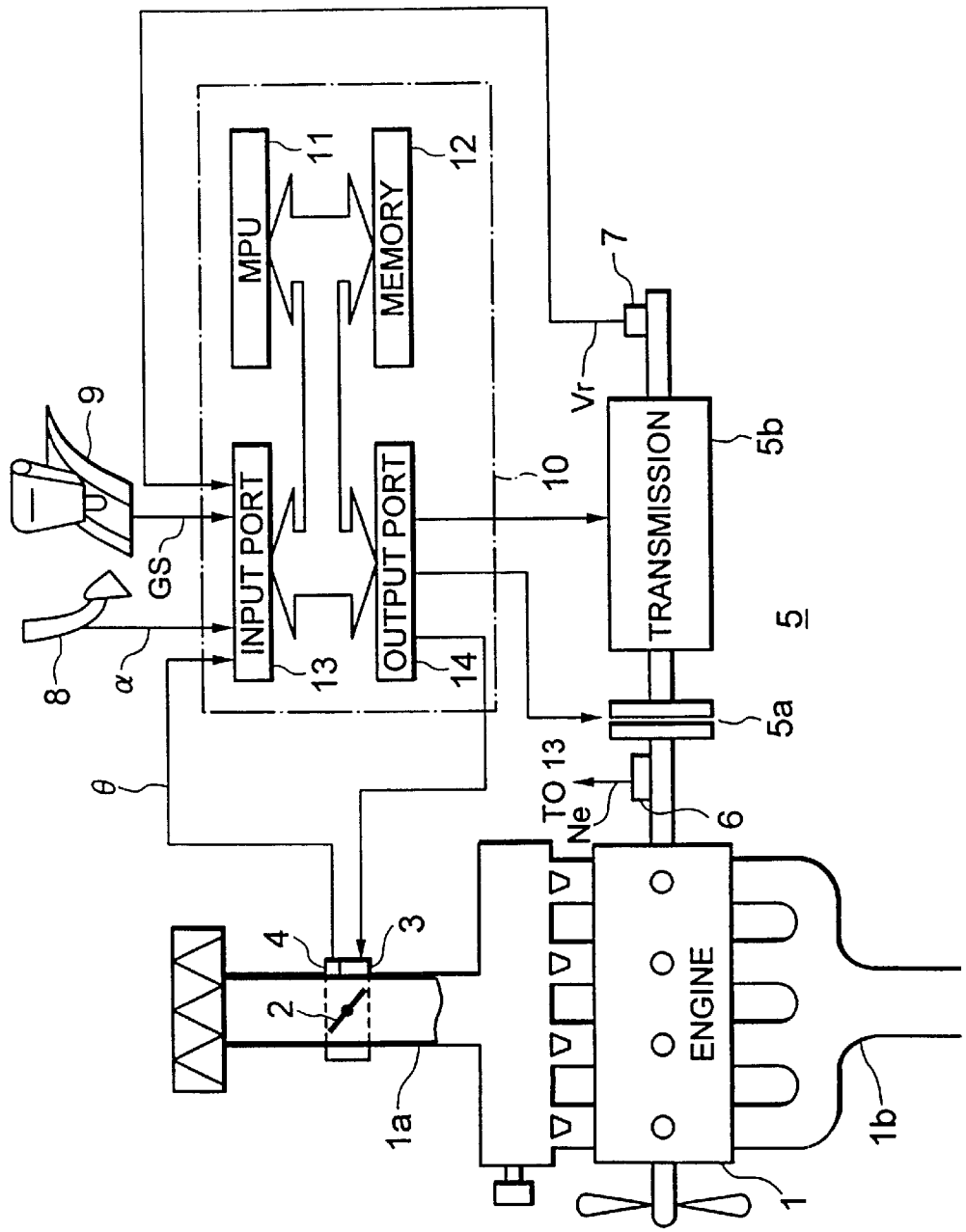
FIG. 5 is a diagram illustrating the constitution of a generally employed device for controlling an engine equipped with a synchronous mesh-type automatic transmission.

Described below with reference to FIGS. 1 and 2 together with FIG. 5 is the control operation during the acceleration (up-shifting the speed) according to the embodiment 1 of the invention.

In FIG. 1, first, the controller 10 judges whether the operation conditions of the engine 1 are changing (accelerating)(step S1).

When it is judged at step S1 that the speed is not changing (i.e., no), the routine proceeds to a speed-change end processing (step S17) that will be described later, and the value of flag FL representing the state of engine rotational speed Ne is set to "1" (step S18), and the routine of FIG. 1 ends. The flag FL has been set to "1" in advance.

When it is judged at step S1 that the speed is changing (i.e., yes), then, it is judged whether the value of flag FL is "1" (step S2). When it is judged that FL≠1(i.e., no), the routine proceeds to step S6 (described later).

When it is judged at step S2 that FL=1(i.e., yes), the controller 10 starts executing the control operation during the acceleration.

That is, referring to FIG. 2, the clutch 5a is disconnected, and the throttle opening degree θ is fixed to a first predetermined opening degree (fully closed position here)(step S3).

Figure 6:
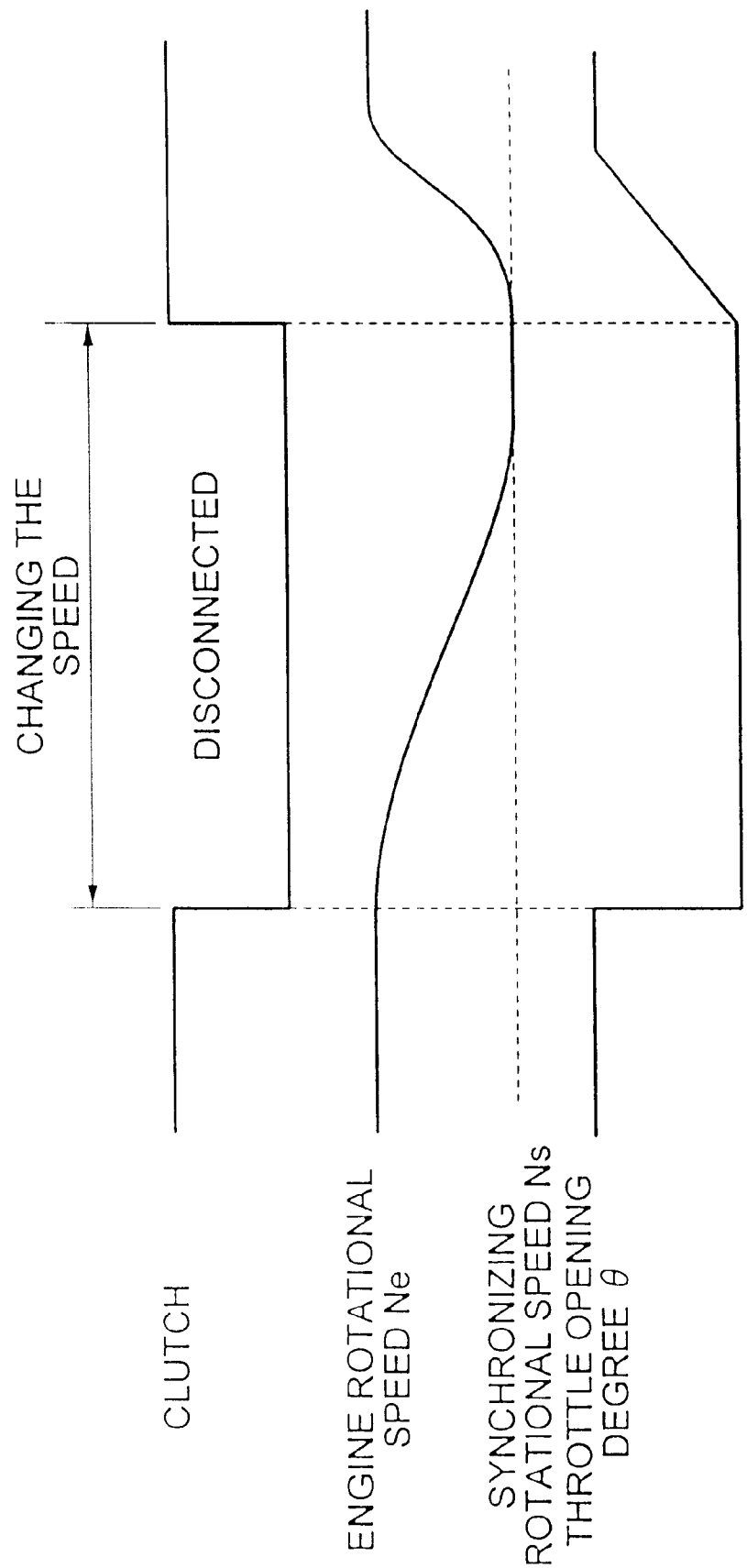
FIG. 6 is a timing chart illustrating the control operation using a conventional device for controlling an engine equipped with a synchronous mesh-type automatic transmission.
Figure 7:
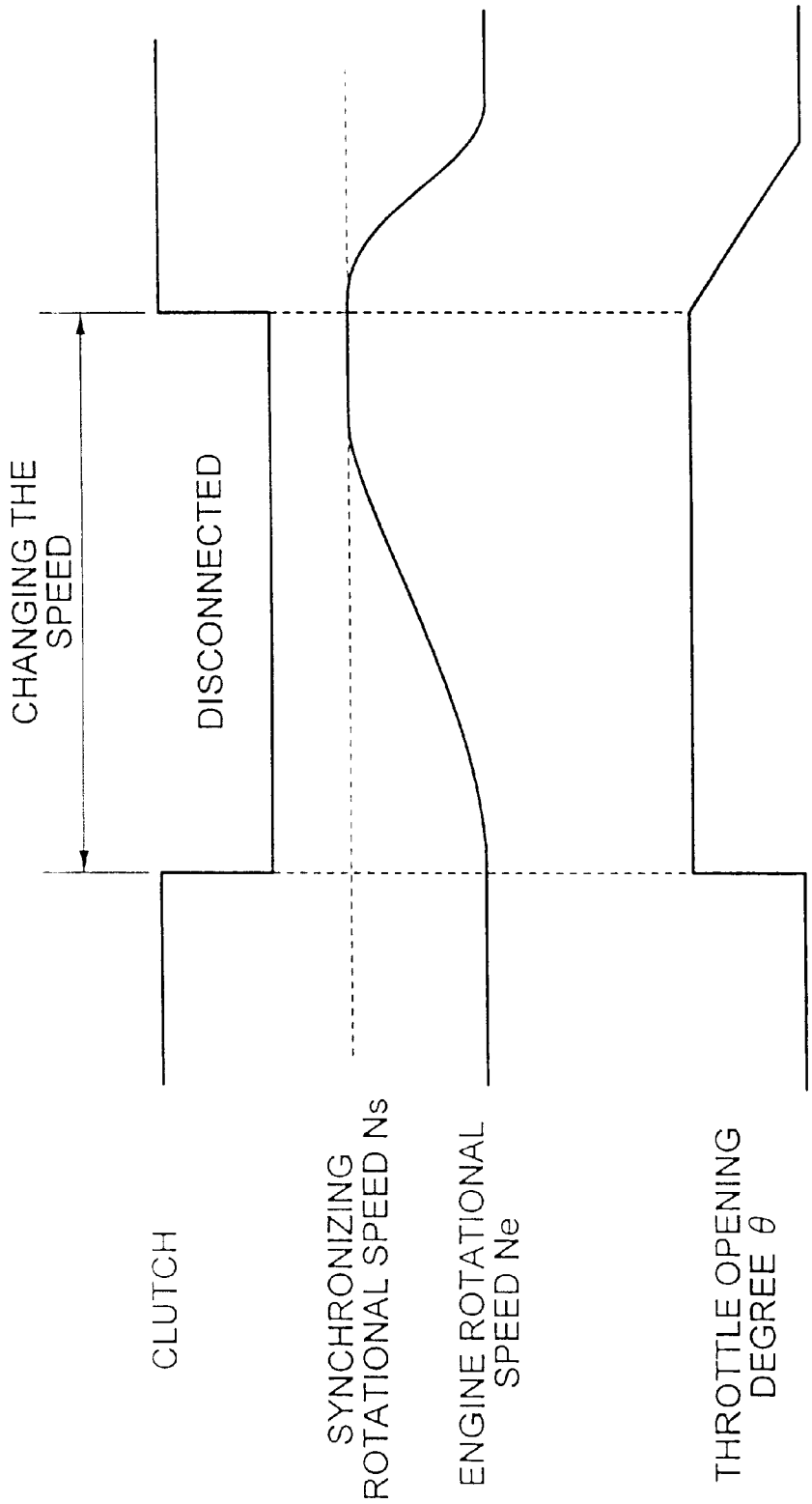
FIG. 7 is a timing chart illustrating the control operation using the conventional device for controlling the engine equipped with the synchronous mesh-type automatic transmission.

Then, as shown in FIG. 2, the engine rotational speed Ne decreases more quickly than when decreased as described above (see FIG. 6).

Next, it is judged whether the engine rotational speed Ne has converged to lie within the first predetermined range (ΔN1) of the synchronizing rotational speed Ns (step S4).

When it is judged that Ne≧Ns+ΔN1 (i.e., no), it means that the engine rotational speed Ne has not been sufficiently converted to the synchronizing rotational speed Ns, and the routine of FIG. 1 ends.

When it is judged at step S4 that Ne<Ns+ΔN1 (i.e., yes), it means that the engine rotational speed Ne has been sufficiently converged to the synchronizing rotational speed Ns. Therefore, the flag FL is set to a value "2" that represents the converged state of the engine rotational speed Ne (step S5), and the routine of FIG. 1 ends.

When the step S2 is executed next, it is judged that FL≠1(i.e., no), whereby the routine proceeds to step S6 where it is judged whether the value of the flag FL is "2".

When it is judged at step S6 that FL=2 (i.e., yes), it means that the engine rotational speed Ne has been converged to the synchronizing rotational speed Ns and, hence, the throttle opening degree θ is gradually increased as shown in FIG. 2 (step S7).

Here, a delay in time is involved until the throttle opening degree θ affects the engine rotational speed Ne. Right after the start of gradual increase in the throttle opening degree θ, therefore, the engine rotational speed Ne continues to decrease down to a rotational speed which is slightly lower than the synchronizing rotational speed Ns.

Then, it is judged whether a change ΔNe in the engine rotational speed Ne is reversed (ΔNe≧0) from the direction of reduction (ΔNe<0)(step S8). When it is judged that ΔNe<0 (i.e., no), the engine rotational speed Ne continues to decrease, and the routine of FIG. 1 ends.

When it is judged at step S8 that ΔNe≧0 (i.e., yes), the direction of change in the engine rotational speed Ne is inverted. Therefore, the value of flag FL representing the state of the engine rotational speed Ne is set to "3" (step S9), and the routine of FIG. 1 ends.

When the step S6 is executed next, therefore, it is judged that FL≠2 (i.e., no), and the routine proceeds to step S10 where it is judged whether the value of the flag FL is "3".

When it is judged at step S10 that FL=3 (i.e., yes), it means that the direction of change in the engine rotational speed Ne is inverted. Therefore, the processing is executed as described below for connecting the clutch 5a again.

That is, it is judged whether the difference in the rotational speed |NS−Ne| between the engine rotational speed Ne and the synchronizing rotational speed Ns has converged to lie within the second predetermined range ΔN2 (step S12) while continuing the processing for gradually increasing the throttle opening degree θ (step S11).

When it is judged at step S12 that |Ns−Ne|≧ΔN2 (i.e., no), the difference in the rotational speed is still large, and the routine of FIG. 1 ends.

When it is judged at step S12 that |Ns−Ne|<ΔN2 (i.e., yes), it means that the difference in the rotational speed is becoming sufficiently small (state where the engine rotational speed Ne is converged to the synchronizing rotational speed Ns to a sufficient degree) after the change in the engine rotational speed Ne has inverted and, hence, the clutch 5a is connected again (step S13) as shown in FIG. 2.

Thereafter, the value of the flag FL representing the state of the engine rotational speed Ne is set to "4" (step S14), and the routine of FIG. 1 ends.

When the step S10 is executed next, therefore, it is so judged that FL≠3 (i.e., no), whereby the routine proceeds to step S15 to execute the processing to end the change of speed.

That is, it is judged whether the throttle opening degree θ has reached the target opening degree $θ_0$ (corresponds to the accelerator opening degree α) requested by the driver (step S16) while continuing the processing for gradually increasing the throttle opening degree θ (step S15).

When it is judged at step S16 that $θ<θ_0$ (i.e., no), the throttle opening degree θ is not still reaching the target opening degree $θ_0$. To continue the processing for gradually increasing the throttle opening degree θ (step S15), therefore, the routine of FIG. 1 ends.

When it is judged at step S16 that $θ=θ_0$ (i.e., yes), it means that the throttle opening degree θ, that is gradually increasing, has reached the target opening degree $θ_0$. Therefore, the processing for changing the speed ends (step S17), the value of the flag FL representing the state of the engine rotational speed Ne is set to the initial value "1" (step S18), and the routine of FIG. 1 ends.

When the clutch is disconnected at the time of changing the speed during the acceleration, as described above, the throttle opening degree θ is set to the fully closed position (first predetermined opening degree)(step S3), the throttle opening degree θ is gradually increased from a moment when the engine rotational speed Ne has dropped down to a rotational speed that is higher than the synchronizing rotational speed Ns by a predetermined rotational speed ΔN1 (when the difference in the rotational speed |NS−Ne| has converged to lie within the first predetermined range A N1)(step S7) and, after the change ΔNe in the engine rotational speed has inverted to the increasing side, the clutch 5a is connected at a moment when the difference in the rotational speed |NS−Ne| has converged to lie within the second predetermined range ΔN2 (step S13).

This makes it possible to decrease the shock at the time of changing the speed during the acceleration and to shorten the time of changing the speed.

Since the clutch 5a can be connected at a moment when the engine rotational speed Ne has reliably converged to the synchronizing rotational speed Ns, it is allowed to absorb dispersion in the conditions caused by the individual engines and the warmed-up state, making it possible to control the change of speed maintaining high precision.

Further, when the clutch 5a is connected at the time of changing the speed during the accleration, the engine rotational speed Ne is still slightly increasing (see FIG. 2) after it has inverted into the increasing side, and does not impair the feeling for the driver during the acceleration.

Here, the first predetermined opening degree was set to the fully closed position to quickly lower the engine rotational speed Ne at the time of changing the speed during the acceleration. Here, however, the first predetermined opening degree may be set to an opening degree which is smaller than the opening degree for maintaining the synchronizing rotational speed Ns and may, hence, be set to an opening degree near the fully closed position.

The first and second predetermined ranges ΔN1 and ΔN2 can be set in any rotational speed range depending upon the required specifications.

In the foregoing was described the operation at the time of changing the speed during the acceleration with reference to FIGS. 1 and 2. At the time of changing the speed during the deceleration, the same control operation may be executed in the opposite polarity.

Next, described below with reference to FIG. 3 is the operation for controlling the throttle opening degree θ and the clutch 5a when the engine 1 is decelerating and the automatic transmission 5 is down-shifting.

In disconnecting the clutch at the time of changing the speed during the deceleration, the throttle opening degree-fixing means in the controller 10 sets the throttle opening degree θ to the first predetermined opening degree (fully opened position) larger than the opening degree for maintaining the synchronizing rotational speed Ns, so that the engine rotational speed Ne quickly increases so as to be converged to the synchronizing rotational speed Ns.

The throttle opening degree-returning means in the controller 10 gradually decreases the throttle, opening degree θ at a moment when the engine rotational speed Ne has converged to lie within the first predetermined range ΔN1 from the synchronizing rotational speed Ns.

Thereafter, the engine rotational speed Ne increases to a rotational speed slightly larger than the synchronizing rotational speed Ns and is, then, inverted into the decreasing side to approach the synchronizing rotational speed Ns.

The clutch re-connection means in the controller 10 connects the clutch 5a at a moment when the engine rotational speed Ne has converged to lie in the second predetermined range ΔN2 from the synchronizing rotational speed Ns after a change ΔNe in the engine rotational speed Ne has inverted into the decreasing side.

The operation for changing the speed ends at a moment when the throttle opening degree θ, that is gradually decreasing, has decreased to the target opening degree $\theta_0$.

When the clutch is disconnected at the time of changing the speed during the deceleration, as described above, the throttle opening degree θ is set to the fully opened position (first predetermined opening degree), the throttle opening degree θ is gradually decreased from a moment when the engine rotational speed Ne has increased to a rotational speed that is lower than the synchronizing rotational speed Ns by a predetermined rotational speed ΔN1 and, after the change ΔNe in the engine rotational speed has inverted to the decreasing side, the clutch 5a is connected at a moment when the difference in the rotational speed |NS−Ne| has converged to lie within the second predetermined range ΔN2.

This makes it possible to decrease the shock at the time of changing the speed during the deceleration, to shorten the time for changing the speed and to absorb dispersion of various conditions in the same manner as described above.

Further, when the clutch 5a is connected at the time of changing the speed during the deceleration, the engine rotational speed Ne is still slightly decreasing (see FIG. 2) after it is inverted to the decreasing side, and does not impair the drive feeling for the driver during the deceleration.

Here, the first predetermined opening degree was set to the fully opened position to quickly increase the engine rotational speed Ne at the time of changing the speed during the deceleration. Here, however, the first predetermined opening degree may be set to an opening degree which is larger than the opening degree for maintaining the synchronizing rotational speed Ns and may, hence, be set to an opening degree near the fully opened position.

Embodiment 2.

In the above-mentioned embodiment 1, the throttle opening degree θ was gradually returned (gradually increased or gradually decreased) at a moment when the difference in the rotational speed |NS−Ne| has converged to lie within the first predetermined range ΔN1 after the throttle opening degree θ was fixed to the first predetermined opening angle. However, the throttle opening degree θ may be returned back stepwisely.

Or, the throttle opening degree θ may be instantaneously returned to the second predetermined opening angle and may then be returned at a more gradual rate.

Figure 4:
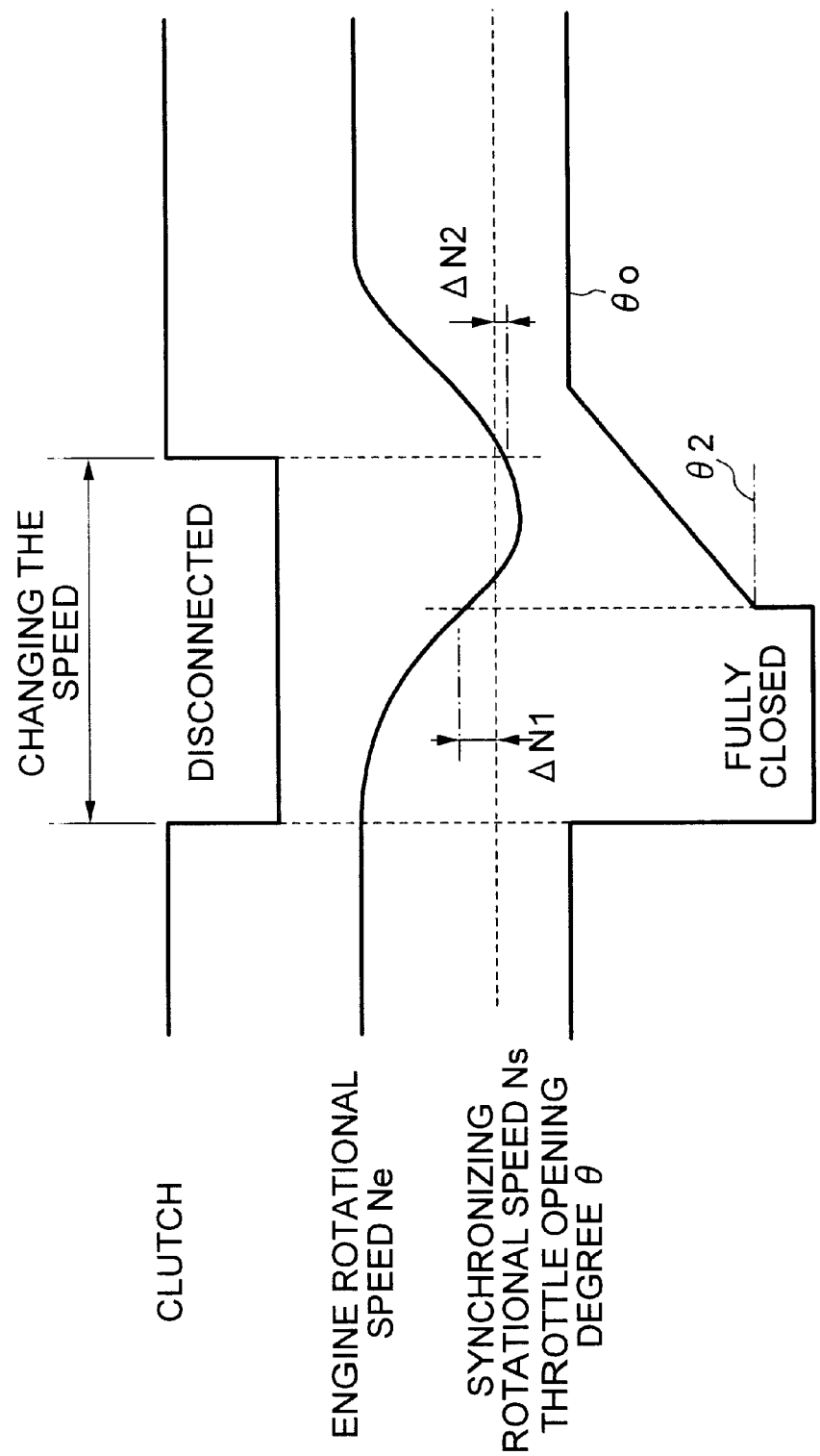
FIG. 4 is a timing chart illustrating the control operation according to an embodiment 2 of the present invention.

FIG. 4 is a timing chart illustrating the control operation according to an embodiment 2 of the present invention in which the throttle opening degree θ, that is returning, is set to the second predetermined opening degree $\theta_2$ and is, then, gradually returned (gradually increased), while changing the speed during the acceleration.

In FIG. 4, the throttle opening degree-returning means in the controller 10 sets the throttle opening degree θ to the second predetermined opening degree $\theta_2$ between the first predetermined opening degree (fully closed position) and the opening degree corresponding to the synchronizing rotational speed Ns at a moment when the difference in the rotational speed |NS−Ne| has converged to lie within the first predetermined range ΔN1 and, then, gradually returns the throttle opening degree θ to the opening degree corresponding to the synchronizing rotational speed Ns from the second predetermined opening degree $\theta_2$.

Though not diagramed, the operation at the time of changing the speed during the deceleration is the same as the operation of FIG. 4 which, however, is executed in a reverse polarity.

Thus, the throttle opening degree θ is gradually returned after it is set to the second predetermined opening degree $\theta_2$ to quickly end the returning operation in addition to accomplishing the action and effect same as those described above.

What is claimed is:

1. A device for controlling an engine equipped with a synchronous mesh-type automatic transmission comprising:

various sensors for detecting the operation conditions of an engine inclusive of an engine rotational speed;

a throttle actuator for adjusting the throttle opening degree for setting the amount of the air taken in by the engine;

an automatic transmission including a clutch and a transmission, connected to the output side of the engine; and a controller for controlling the throttle actuator and the automatic transmission based upon the operation conditions;

wherein the controller includes:
 clutch disconnection means for disconnecting the clutch at the time of changing the speed of the engine;
 synchronizing rotational speed-operating means for setting a synchronizing rotational speed of the engine rotational speed so as to be brought into synchronism with the output rotational speed of the clutch while the clutch is being disconnected;
 throttle opening degree-fixing means for fixing the throttle opening degree to a first predetermined opening degree, so that the engine rotational speed quickly converges to the synchronizing rotational speed while the clutch is being disconnected;
 throttle opening degree-returning means for gradually returning the throttle opening degree from said first predetermined opening degree toward an opening degree corresponding to said synchronizing rotational speed at a moment when a difference in the rotational speed between the engine rotational speed and the synchronizing rotational speed has converged to lie within a first predetermined range; and
 clutch re-connection means for connecting the clutch again at a moment after the direction of change in the engine rotational speed is inverted.

2. A device for controlling an engine equipped with a synchronous mesh-type automatic transmission according to claim 1, wherein the clutch re-connection means connects the clutch again at a moment when the difference in the rotational speed has converged to lie within a second predetermined range after the direction of change in the engine rotational speed is inverted.

3. A device for controlling an engine equipped with a synchronous mesh-type automatic transmission according to claim 1, wherein the throttle opening degree-returning means sets the throttle opening degree to the second predetermined opening degree between a first predetermined opening degree and an opening degree corresponding to the synchronizing rotational speed at a moment when the difference in the rotational speed has converged to lie within the first predetermined range, and gradually returns the throttle opening degree from the second predetermined opening degree toward the opening degree corresponding to the synchronizing rotational speed.

4. A device for controlling an engine equipped with a synchronous mesh-type automatic transmission according to claim 1, wherein, when the engine is under an accelerating condition and the automatic transmission is in an up-shifting state, the throttle opening degree-fixing means sets the first predetermined opening degree to be smaller than the throttle opening degree that maintains the synchronizing rotational speed, and the throttle opening degree-returning means gradually increases the throttle opening degree from a moment when the difference in the rotational speed has converged to lie within the first predetermined range.

5. A device for controlling an engine equipped with a synchronous mesh-type automatic transmission according to claim 4, wherein the throttle opening degree-fixing means sets the first predetermined opening degree to the fully closed position.

6. A device for controlling an engine equipped with a synchronous mesh-type automatic transmission according to claim 1, wherein, when the engine is under a decelerating condition and the automatic transmission is in a down-shifting state, the throttle opening degree-fixing means sets the first predetermined opening degree to be larger than the throttle opening degree that maintains the synchronizing rotational speed, and the throttle opening degree-returning means gradually decreases the throttle opening degree from a moment when the difference in the rotational speed has converged to lie within the first predetermined range.

7. A device for controlling an engine equipped with a synchronous mesh-type automatic transmission according to claim 6, wherein the throttle opening degree-fixing means sets the first predetermined opening degree to the fully opened position.

* * * * *